Nov. 17, 1953 J. R. WOOD 2,659,237
REVERSING DRIVE MECHANISM
Filed July 22, 1952 7 Sheets-Sheet 1

INVENTOR.
JAMES R. WOOD
BY Hudson, Boughton,
Williams, David & Hoffmann
ATTORNEYS Nov. 17, 1953 J. R. WOOD 2,659,237
REVERSING DRIVE MECHANISM
Filed July 22, 1952 7 Sheets-Sheet 6

INVENTOR.
JAMES R. WOOD
BY Hudson, Boughton,
Williams, David & Hoffmann
ATTORNEYS Nov. 17, 1953 J. R. WOOD 2,659,237
REVERSING DRIVE MECHANISM
Filed July 22, 1952 7 Sheets-Sheet 7

INVENTOR.
JAMES R. WOOD
BY Hudson Goughton,
Williams, David & Hoffmann
ATTORNEYS Patented Nov. 17, 1953

2,659,237

UNITED STATES PATENT OFFICE 2,659,237

REVERSING DRIVE MECHANISM

James R. Wood, Cleveland, Ohio, assignor to Harris-Seybold Company, Cleveland, Ohio, a corporation of Delaware Application July 22, 1952, Serial No. 300,272

12 Claims. (Cl. 74—27)

This invention relates to improvements in reversing drive mechanism, that is to say mechanism for driving a mechanical element such as a shaft, a rack or other reciprocating means forward and backward with means for decelerating to zero speed and accelerating again at the ends of the stroke.

Mechanism of this kind is especially useful for reciprocating heavy mechanical bodies at relatively high speeds, such for example as the bed of a reciprocating bed printing press. In such mechanism it is important that the transition from motion in one direction to motion in the opposite direction be effected smoothly and without shock.

One of the objects of the invention therefore is the provision of smoothly functioning means for accelerating an oscillating or reciprocating mass from zero speed to constant speed, decelerating the mass to zero speed, accelerating it in the opposite direction to constant speed, decelerating it to zero speed, and repeating the said movements.

Another object is the provision of driving shafts turning constantly at the same speed in opposite directions, transmitting drive from each of said shafts to a driven reverse motion shaft during different parts of a cycle and effecting deceleration and acceleration between opposed constant speed travel portions of the cycle by means of cams and followers on the said constant speed shafts on the one hand and the reverse motion shaft on the other.

Still another object is the provision of accelerating and decelerating cam means wherein driving rollers on the constant speed shafts travel over approximately radial cam shoes on the reverse motion shaft, whereby the transition from constant speed travel to acceleration or deceleration is accomplished without shock.

Other objects and features of novelty will appear as I proceed with the description of that embodiment of the invention which, for the purposes of the present application, I have illustrated in the accompanying drawings in which, Fig. 1 is a diagrammatic view of a reverse motion shaft, a forward motion shaft and a rearward motion shaft arranged in operative relation, illustrating the parts in the positions which they occupy at the start of the forward motion portion of a stroke.

Figure 7:
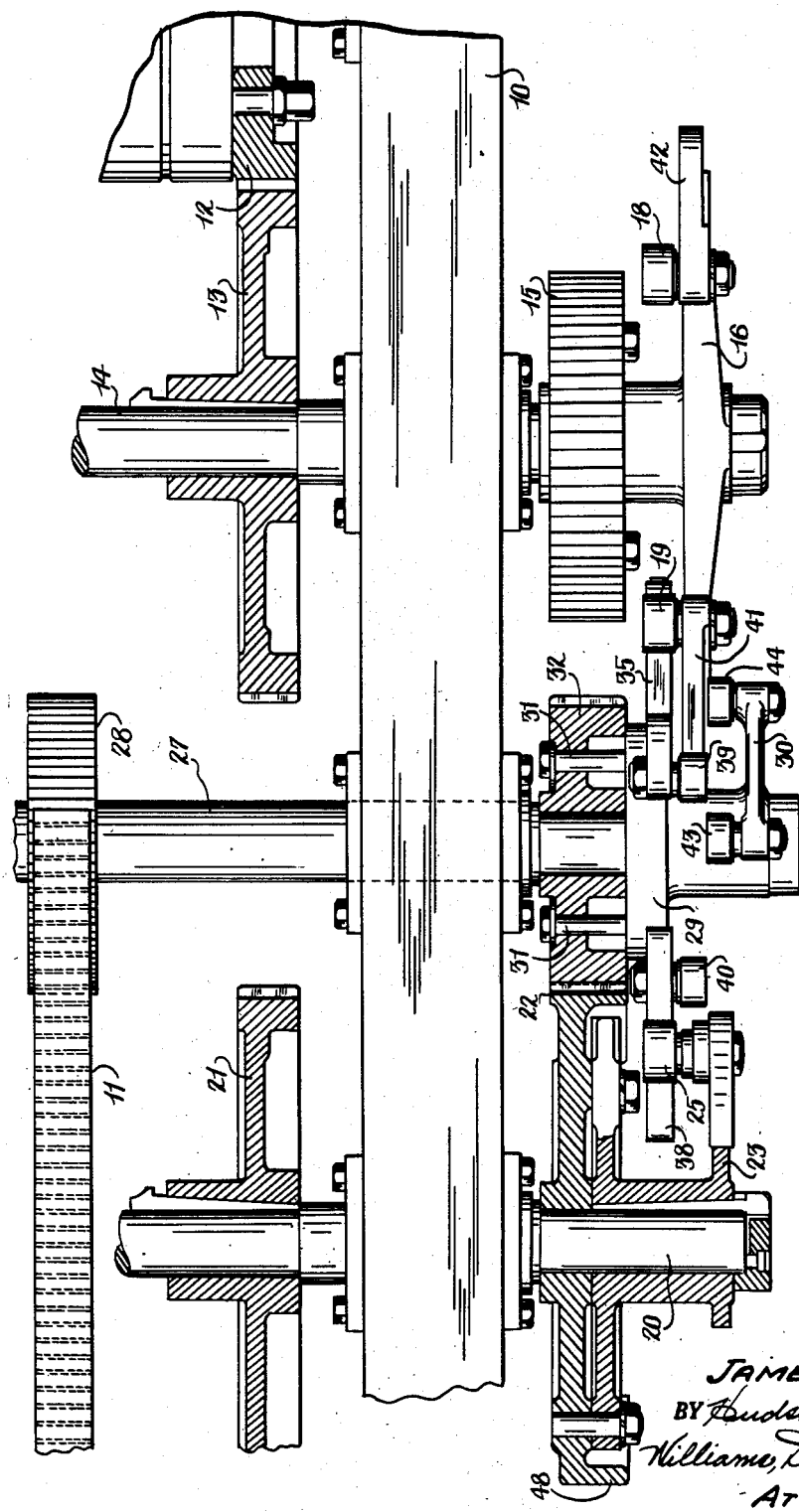
Fig. 7 is a diagrammatic plan view of the reversing drive mechanism with the rearward motion shaft swung around the axis of the reverse motion shaft to better illustrate the invention.

Referring first to Fig. 7 of the drawing, 10 represents one of the side frame members of a machine embodying drive mechanism for reciprocating a rack 11 attached to a reciprocating body, not shown.

A fragment of a drive gear is shown at 12 meshing with a gear 13 keyed to a shaft 14 hereinafter termed the forward motion shaft. This shaft is journaled in the frame of the machine and outside the frame it carries a gear segment 15 and a two armed bracket 16 with a balancing weight 17. Rollers 18 and 19 are journaled on the rear side of this bracket on the pitch line of the teeth of segment 15, as shown in the remaining figures of the drawing.

A shaft 20, hereinafter called the rearward motion shaft, is journaled in the frame diagonally below shaft 14. To it is keyed a gear 21 which is of the same size as gear 13 and is in mesh therewith. Consequently the two shafts 14 and 20 turn constantly at the same speed but in opposite directions. Shaft 20 carries a gear segment 22 of the same size and same radius as segment 15. Keyed to this shaft also there is a two armed bracket 23 which may be identical with bracket 16 and carries rollers 24 and 25 disposed on the pitch line of the teeth of segment 22. Bracket 23 comprises a balancing weight 26.

A third shaft 27, hereinafter called the reverse motion shaft, is also journaled in the frame at equal distances from the shafts 14 and 20. Inside the frame members this shaft has keyed thereto a gear 28 which meshes with a rack 11 and remains in mesh therewith at all times. The rotation of this gear in opposite directions produces reciprocation of the rack. Shaft 27 has keyed thereto a bracket comprising a plate element 29 and a two armed element 30. Fastened to the rear surface of plate element 29 by means of studs 31 is a gear 32 which is adapted to mesh with gear segments 15 and 22 at different times.

Plate element 29 comprises four approximately radial cam shoes 35, 36, 37 and 38, which are positioned to be engaged at the proper time by driving rollers 19, 25, 24 and 18 respectively. Plate element 29 also carries roller followers 39 and 40 which are disposed to engage the perimeter of cams 41 and 42 which are formed at the extremities of the two arms of bracket 16.

The element 30 near its end carries roller followers 43 and 44 which are so positioned as to contact cam surfaces 45 and 46 respectively on the extremities of the two armed bracket 23.

Balancing weights 47 and 48 may be carried by the shafts 14 and 20 opposite the gear segments 15 and 22 respectively.

Figure 1:
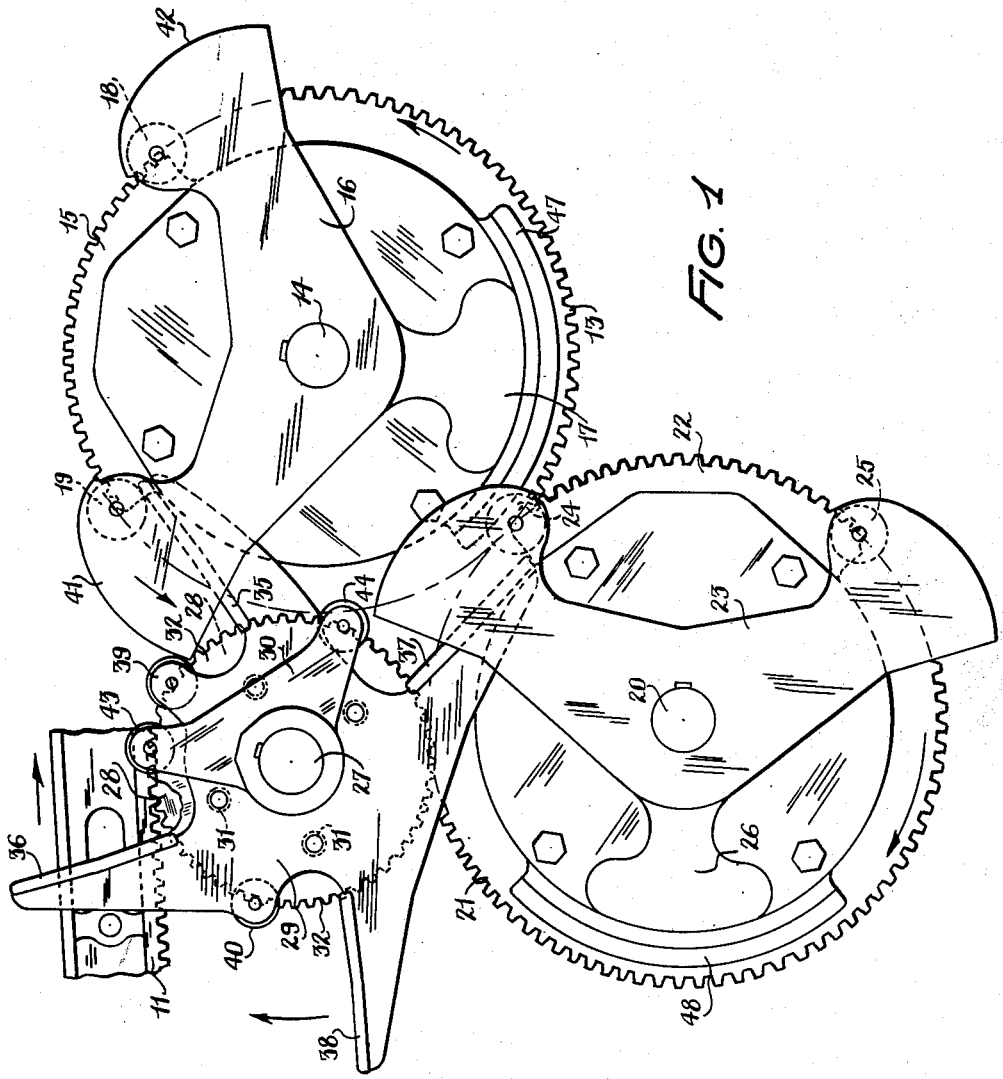

Operation. The different parts of the mechanism are shown in Fig. 1 at the beginning of a cycle, at which time the shaft 27 is stationary. Driving roller 19 on the constantly moving forward motion shaft 14 is beginning to engage the outer end portion of cam shoe 35 on the reverse motion shaft. The contour of the shoe is such that roller 19, moving in its circular path, rides onto the shoe smoothly and produces the desired acceleration, increasing the speed of the reverse motion shaft 27 from zero speed to the surface speed of the pitch line of gear segment 15. While this acceleration is going on roller follower 39 rides over the perimeter of cam 41. The interengagement of roller 39 with cam 41 is not for the purpose of accelerating the reverse motion shaft, that result being accomplished solely by the action of roller 19 on cam shoe 35. On the contrary the interaction between roller 39 and cam 41 functions merely to maintain engagement between roller 19 and cam shoe 35, in other words to prevent shoe 35 from running ahead of roller 19.

Figure 2:
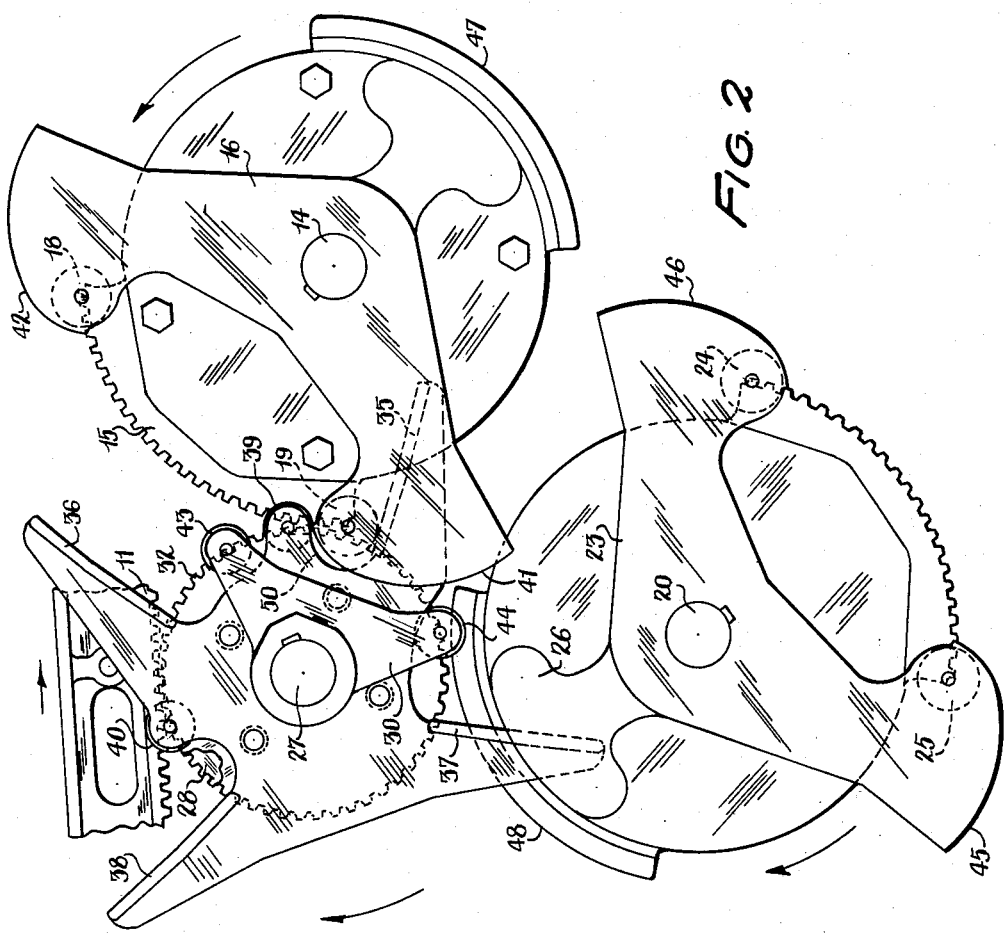
Fig. 2 is a similar view illustrating the positions of the parts shortly after the accelerating period has ended and the constant speed period has begun.
Figure 3:
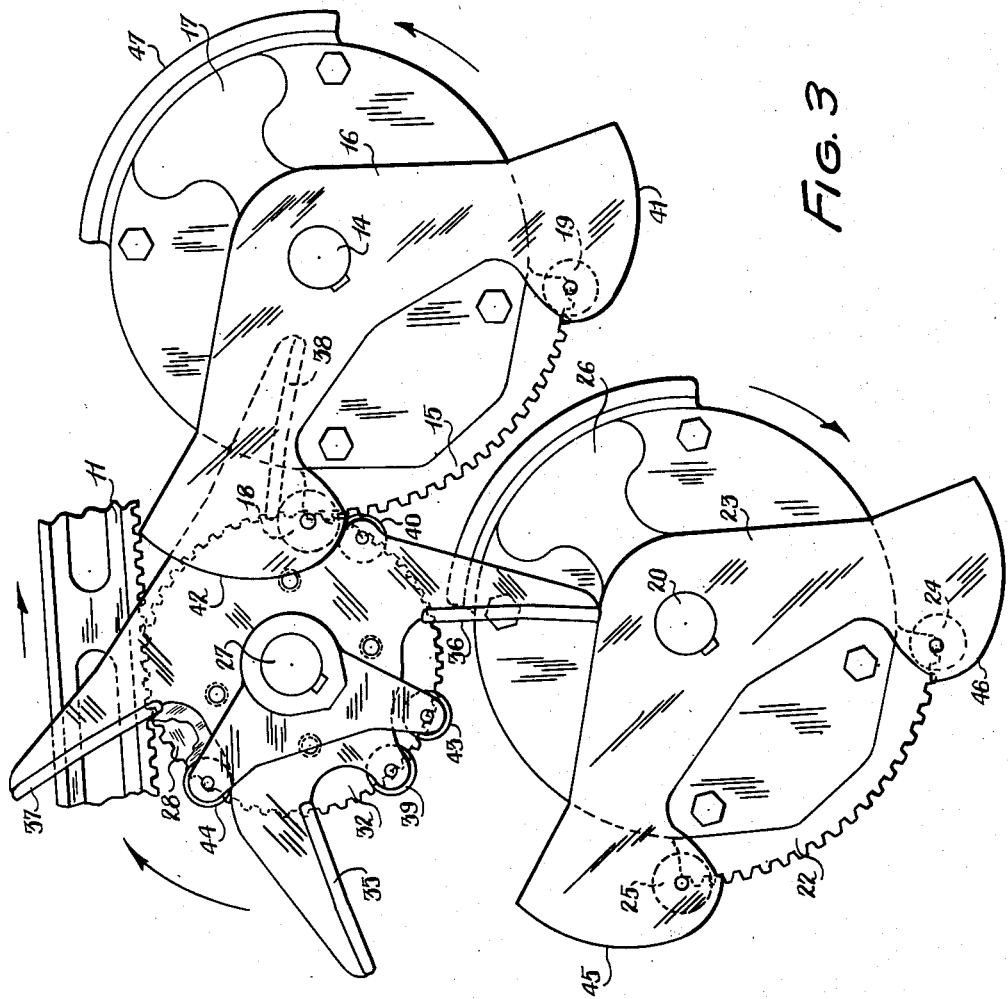
Fig. 3 is a similar view showing the parts in the positions which they occupy at about the end of the constant speed forward travel and the beginning of the deceleration period.
Figure 4:
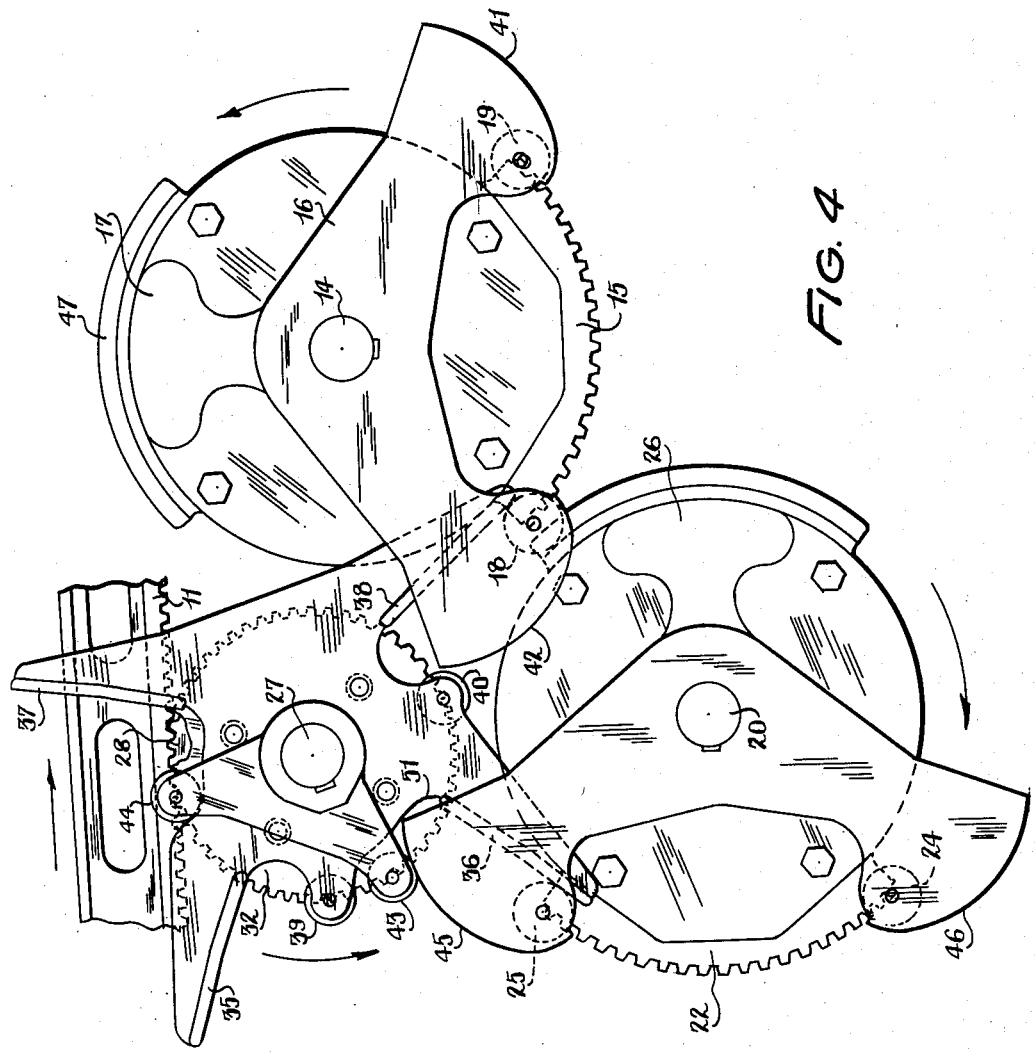
Fig. 4 is a similar view showing the parts at approximately the end of the deceleration period and the beginning of the acceleration period in the rearward direction.

At the time acceleration is completed, roller 19 will lie on the line of centers of shafts 14 and 27 and will have entered a cutout 50 in plate 29. At this point gear segment 15 will begin to mesh with gear 32. As indicated in Fig. 2 of the drawing, shaft 27 will then rotate in the forward direction indicated by the arrow in that figure at constant speed for about 90° of rotation of shaft 14, bringing the parts to the positions indicated in Fig. 3 where the gear segment 15 is going out of mesh with gear 32 and roller 18 has begun its contact with the inner end of cam shoe 38. Now roller 18 begins to roll outwardly on cam shoe 38, retarding or decelerating shaft 27 gradually and smoothly, bringing the parts to the positions of Fig. 4. When the roller 18 reaches the outer end of shoe 38 the speed of shaft 27 will have been reduced to zero, and the rack 11 will be stationary and ready to begin its rearward travel.

Figure 5:
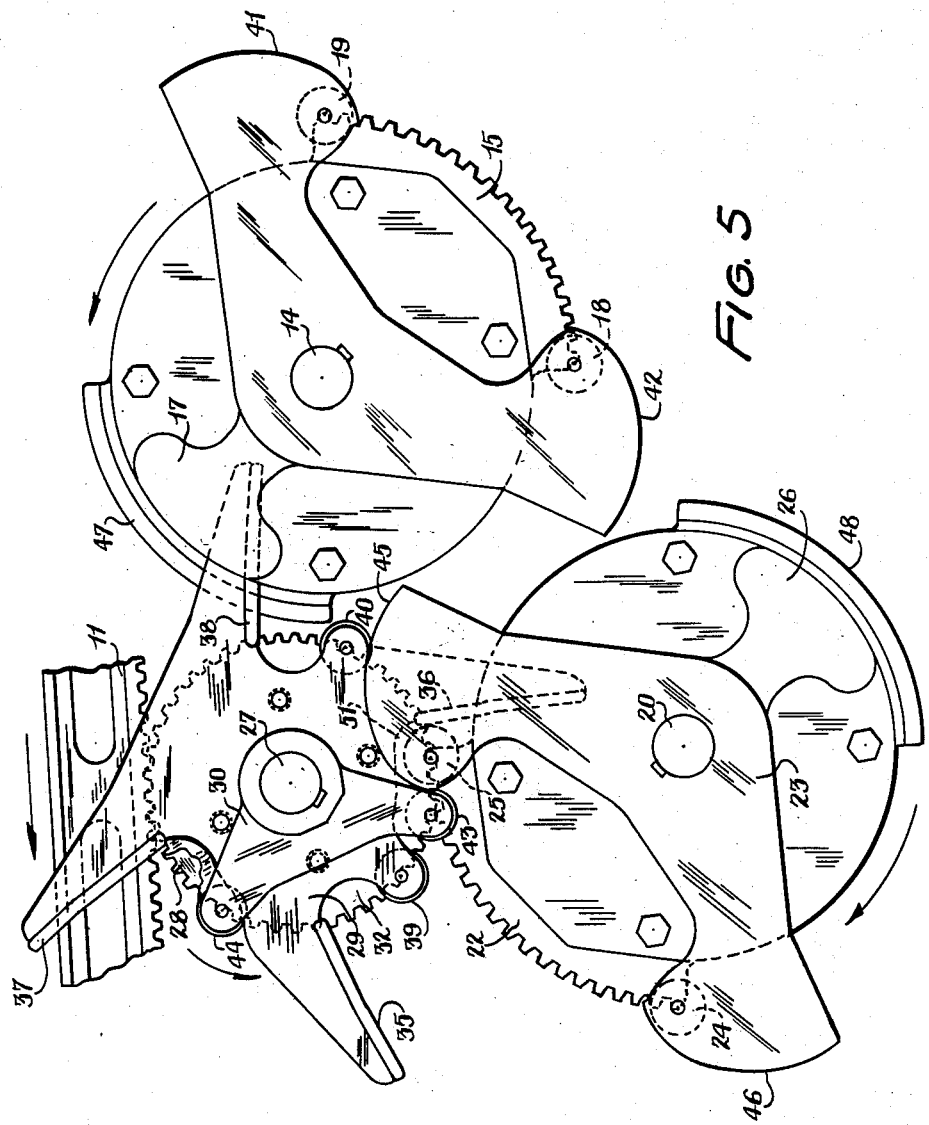
Fig. 5 is a similar view showing the positions of the parts shortly after the end of the acceleration period of rearward travel and the beginning of the constant speed rearward travel.
Figure 6:
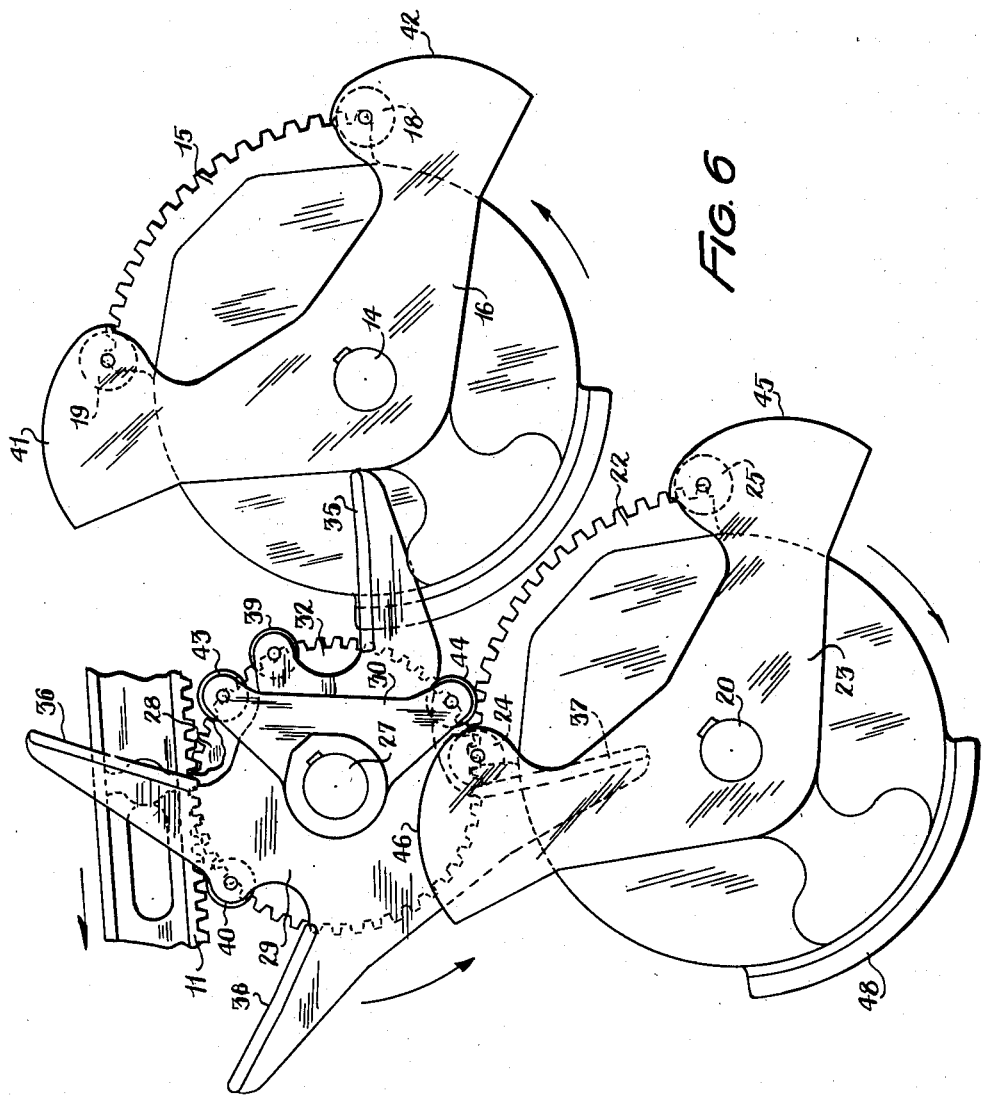
Fig. 6 is a similar view showing the positions of the parts shortly after the end of the constant speed rearward travel and the beginning of the deceleration period.

As previously stated rearward motion shaft 20 rotates constantly at the same speed as shaft 14 but in the opposite direction. At the point of the cycle illustrated in Fig. 4 driving roller 25 carried by shaft 20 is beginning to run onto cam shoe 36 which is attached to reverse motion shaft 27. Consequently shaft 27 begins to accelerate in the reverse direction indicated by the arrow in Fig. 4. During this acceleration roller follower 43 on shaft 27 runs on the perimeter of cam 45, thereby holding roller 25 and cam 36 in contact. At the end of this motion of acceleration roller 25 extends into a cutout 51 in plate 29, and gear segment 22 begins to mesh with gear 32, as illustrated in Fig. 5. Gear segment 22 is in mesh with gear 32 for approximately 90° of angle of the shaft 20, thereby driving shaft 27 at constant speed in the rearward direction until the parts reach the positions of Fig. 6. Here the gear segment 22 leaves gear 32 and cam shoe 38 catches up with roller 24, after which the latter rolls outwardly on shoe 38, thereby decelerating that shoe and the shaft 27 upon which it is carried. During deceleration roller follower 44 runs upon cam 46 and holds the cam and follower 38, 24 in contact. At the end of this deceleration the parts are again in the positions of Fig. 1 and a new cycle begins.

Cam shoes 35, 36, 37 and 38 are straight at their inner ends and for a major portion of their active surfaces but the outer ends are curved somewhat for the purpose of imparting substantially constant acceleration and deceleration to the reverse motion shaft between zero speed and its constant speed. Each motion of acceleration or deceleration occupies about 45° of rotation of the reverse motion shaft.

The angular relationship of shafts 14 and 20 illustrated in the drawings is quite satisfactory, but more or less variance from this angle is permissible, it being understood that a change of this kind will require some change also in the design of the cams and the location of the followers.

In the illustrated case the forward and rearward motion shafts 14 and 20 carry brackets 16 and 23 with associated parts which are substantially identical and the gear segments 15 and 22 are likewise substantially identical. This is of some importance in respect to the cost of manufacture of the machine. This arrangement produces motion of the reverse motion shaft that is substantially identical in both directions. However it will be appreciated that in some instances it may be desirable to provide a relatively rapid return travel, especially where the major part of the work is performed on the forward portion of the stroke. By providing two gears of different diameter on shaft 27 and changing the radius of the gear segments 15 and 22 accordingly, such a result may be obtained. The invention possesses considerable flexibility in this respect.

In the foregoing description I have necessarily gone somewhat into detail in order to explain fully the particular embodiment of the invention herein illustrated, but I desire it to be understood that such detail disclosures are not to be construed as amounting to limitations except as they may be included in the appended claims.

Having thus described my invention, I claim:

1. In combination, a reverse motion shaft, gear teeth carried by said shaft, a forward motion shaft and a rearward motion shaft turning at the same speed in opposite directions, gear sectors on each of said forward and rearward motion shafts adapted to mesh with the gear teeth on said reverse motion shaft for turning the latter shaft in opposite directions at different times in the cycle, said reverse motion shaft carrying spaced cam shoes extending outwardly from the shaft, said forward motion shaft carrying two rollers cooperating with certain of said shoes for accelerating said reverse motion shaft in the forward direction prior to the meshing of its gear teeth with the sector on said forward motion shaft and for decelerating said reverse motion shaft after said sector leaves said gear teeth, and said rearward motion shaft carrying two spaced rollers cooperating with certain of said shoes for accelerating said reverse motion shaft in the reverse direction prior to the meshing of its gear teeth with the sector on said rearward motion shaft and for decelerating said reverse motion shaft after said sector leaves said gear teeth.

2. Mechanism as defined in claim 1, including means carried by said shafts for holding said rollers in engagement with their cooperating shoes until the respective accelerating and decelerating motions have been completed.

3. In combination, a reverse motion shaft, gear teeth carried by said shaft, a forward motion shaft and a rearward motion shaft turning at the same speed in opposite directions, gear sectors on each of said forward and rearward motion shafts adapted to mesh with the gear teeth on said reverse motion shaft for turning the latter shaft at constant speeds in opposite directions at different times in the cycle, said reverse motion shaft carrying four spaced cam shoes extending outwardly from the shaft, said forward motion shaft carrying two rollers cooperating with two of said shoes for accelerating said reverse motion shaft in the forward direction prior to the meshing of its gear teeth with the sector on said forward motion shaft and for decelerating said reverse motion shaft after the said sector leaves said gear teeth, and said rearward motion shaft carrying two spaced rollers cooperating with the remaining two shoes of said reverse motion shaft for accelerating the latter shaft in the reverse direction prior to the meshing of its gear teeth with the sector on said rearward motion shaft for decelerating said reverse motion shaft after said sector leaves said gear teeth.

4. Mechanism as defined in claim 3, including means carried by said shafts for holding said rollers in engagement with their cooperating shoes until the respective accelerating and decelerating motions have been completed.

5. Mechanism as defined in claim 3, comprising means for preventing backlash during said accelerating and decelerating motions, including cams on said forward and rearward motion shafts and rollers on said reverse motion shaft, one roller and one cam interengaging while each shoe on said reverse motion shaft is in engagement with a roller on said forward motion or rearward motion shaft.

6. Mechanism as defined in claim 3, wherein each of said accelerating and decelerating motions of said reverse motion shaft occupies approximately 45° of rotation of the latter shaft.

7. In mechanism for transmitting alternating forward and rearward rotation to a reverse motion shaft, a gear on said shaft, a constant speed forward motion shaft, a gear segment on said forward motion shaft adapted to mesh with said gear for transmitting constant speed rotation in a forward direction to said reverse motion shaft, coacting cam and roller means carried by said shafts for transmitting from said constant speed shaft to said reverse motion shaft accelerating motion from zero speed to said constant speed and decelerating motion from said constant speed to zero speed, and means for rotating said reverse motion shaft in the rearward direction through an angle equal to the angle of its forward rotation and terminating at zero speed.

8. Mechanism as defined in claim 7, wherein said means for rotating the reverse motion shaft in the rearward direction comprises a rearward motion shaft turning constantly at the same speed as said forward motion shaft but in the opposite direction, said rearward motion shaft carrying a gear segment adapted to mesh with said gear for transmitting constant speed rotation in a rearward direction to said reverse motion shaft, coacting cam and roller means carried by said rearward motion and reverse motion shafts for transmitting from said rearward motion shaft to said reverse motion shaft accelerating motion from zero speed to said constant speed and decelerating motion from said constant speed to zero speed.

9. Mechanism as defined in claim 7, wherein said cam means is carried by said reverse motion shaft and the coacting rollers by said forward motion shaft.

10. Mechanism as defined in claim 8, wherein said cam means is mounted on said reverse motion shaft and said rollers on the forward motion and rearward motion shafts.

11. Mechanism as defined in claim 7, comprising cam means on said forward motion shaft and follower means on said reverse motion shaft coacting during acceleration and deceleration for maintaining in contact the cam and follower means which imparts acceleration and deceleration to said reverse motion shaft.

12. Mechanism as defined in claim 8, comprising cam means on said forward and rearward motion shafts and follower means on said reverse motion shaft coacting during acceleration and deceleration both forward and rearward for maintaining in contact the cam and follower means which imparts acceleration and deceleration both forward and rearward to said reverse motion shaft.

JAMES R. WOOD.

No references cited.